United States Patent [19]

Mochida et al.

[11] 4,357,188

[45] Nov. 2, 1982

[54] METHOD FOR MANUFACTURING CIGARETTE FILTERS

[75] Inventors: Naoki Mochida; Kazuhiko Morifuji; Takashi Sakai, all of Toyama, Japan

[73] Assignees: Mitsubishi Rayon Co., Ltd.; Mitsubishi Acetate Co., Ltd., both of Tokyo, Japan

[21] Appl. No.: 198,023

[22] Filed: Oct. 17, 1980

[30] Foreign Application Priority Data

Oct. 22, 1979 [JP] Japan .............................. 54-136173
Feb. 18, 1980 [JP] Japan ................................ 55-18913

[51] Int. Cl.³ .............................................. B29N 9/02
[52] U.S. Cl. ................................ 156/180; 131/341; 131/343; 131/345; 156/156; 156/272.2; 156/273.3; 156/273.5; 219/10.55 R; 219/10.61 R; 427/45.1; 493/43
[58] Field of Search ................ 156/155, 156, 180, 272, 156/273, 274, 441, 380, 272.2, 273.3, 273.5; 427/45.1; 131/343, 345, 341; 219/10.55 R, 10.61 R; 93/1 C

[56] References Cited

U.S. PATENT DOCUMENTS

| 3,804,695 | 4/1974 | Randall et al. | 156/180 |
| 3,890,983 | 6/1975 | Sawada et al. | 156/180 |
| 4,003,774 | 1/1977 | Lebet et al. | 156/180 |
| 4,024,001 | 5/1977 | Lyon et al. | 156/180 |
| 4,074,724 | 2/1978 | Morie et al. | 131/343 |

*Primary Examiner*—James J. Bell
*Attorney, Agent, or Firm*—Sughrue, Mion, Zinn, Macpeak & Seas

[57] ABSTRACT

A method for manufacturing cigarette filters which have a well-stabilized shape in which acetate fibrous tows impregnated with carboxylic acid ester of polyol are formed into a predetermined shape, uniformly impregnated with water, and irradiated with microwave energy. Water is used during the application of microwave energy to enhance the absorption of microwave energy and hence heating of the filter. This causes the carboxylic acid ester of polyol to very rapidly disperse causing it to permeate into the acetate fiber to rapidly complete the stabilization and solidification of the filter.

8 Claims, 4 Drawing Figures

METHOD FOR MANUFACTURING CIGARETTE FILTERS

BACKGROUND OF THE INVENTION

1. Field of the Invention

The present invention relates to a method for manufacturing fibrous rods, such as for cigarette filters, which have a well-stabilized shape, and an apparatus for practicing the method, in which acetate fibrous tows impregnated with carboxylic acid ester of polyol are formed in predetermined shapes or configurations and a processed using microwave energy in microwave absorbing material.

2. Description of the Prior Art

There have been heretofore proposed various methods for manufacturing fibrous rods used in cigarette or other filters. For example, a method for forming fibrous rods of plasticizer impregnated acetate fiber with a filter plug machine is disclosed in U.S. Pat. No. 3,413,689. As described in that patent, the plasticizer impregnated tow is formed into a fibrous rod in a predetermined shape and the periphery of the tow is wrapped with a wrapping paper and a continuous belt to form a filter rod. The stability of the configuration of the rod-shaped fiber wrapped with the paper is determined by the applied plasticizer. The time period required for configuration stabilization due to setting of the plasticizer is typically several hours or more. Therefore, if the wrapping paper is removed from around the rod-shaped fibers before the shape has stabilized, the rod-shaped fibers will expand radially as shown in FIG. 3. Due to this fact, it is almost impossible to produce wrapperless fibrous filter rods using this method.

A wrapperless fibrous filter rod is superior in its ability to remove harmful components in tobacco smoke such as tar although the reason for this improved ability is not known.

A method for producing wrapperless fibrous rods has been proposed in U.S. Pat. Nos. 3,313,306, 3,111,702 and 3,095,343. As described in those patents, a tow impregnated with a plasticizer is circulated and transported by a steam permeable continuous belt and is processed using a pressurized steam. Pressurized steam is used for activating the plasticizer applied to the tow and for promoting adhesion between the fiber filaments of the rod-shaped fibers to thereby stabilize the shaped articles. Using this method, it is possible to produce wrapperless fibrous rods with a high production efficiency. However, since a large amount of water remains in the filter rods, a large amount of energy is needed to remove the moisture. Also pressurized steam must be used which is difficult to handle.

Yet further, a method for manufacturing wrapperless fibrous rods using microwave energy has been proposed in U.S. Pat. No. 4,003,774 and U.K. Patent Application No. 2,030,400. In the fibrous rod manufacturing method proposed in U.S. Pat. No. 4,003,774, an acetate fiber tow to which no plasticizer has been applied is formed in a predetermined shape and is processed using microwave energy. Microwave energy is absorbed by the acetate fiber to thereby plasticize the fiber with heat and to thereby enhance the adhesion between neighboring filaments. It is possible to produce wrapperless fibers using this method. However, since acetate fiber does not have a distinct melting point and the range of thermal plasticization is very narrow above which melting immediately occurs, it is difficult to control the process used for manufacturing fibrous rods according to this method. If impregnated acetate fiber of carboxylic acid ester of polyol is used with this method, the acetate fiber, upon absorbing microwave energy, is nearly instantaneously heated to a temperature of 200° C. or more. In this case, the plasticization of carboxylic acid ester of polyol is quite remarkable. For this reason, melting of the acetate fibers is much more prevalent than adhesion between the acetate fibers. It is, therefore, impossible to effectively produce filter rods having good configuration stabilization and filteration characteristics. Moreover, the plasticizer often evaporates out of the acetate tow upon the application of microwave energy. The evaporated plasticizer causes various difficulties. Therefore, using this method, it is very difficult to produce fibrous rods containing carboxylic acid ester of polyol.

The above noted defects inherent in the method proposed in U.S. Pat. No. 4,003,774 may be overcome using a method disclosed closed in U.K. Patent Application No. 2,030,440. The U.K. Application describes a method wherein a material which is soluble in the acetate fiber and which has a higher microwave absorption ratio than that of the acetate fiber and is essentially fully recoverable is used. That is, a second material is used which is not a solvent and not a plasticizer with respect to the acetate fiber. The second material, which is added to absorb microwave energy, is heated to a temperature of 190° to 280° C. to thus be converted from the liquid state to the vapor state. An acetate fiber tow impregnated with the second material is processed using microwave energy wherein the second material absorbs microwave energy and thereby generates heat with which the acetate fiber is melted and caused to adhere. The vaporized second material is collected and expelled. Thus, with this method, the defects inherent in the method of U.S. Pat. No. 4,030,440 are overcome. However, it is impossible to use in the filter material carboxylic acid ester of polyol. Namely, since the carboxylic acid ester of polyol is a strong plasticizer for the acetate fiber and has low microwave absorption characteristics, if acetate fiber is impregnated with carboxylic acid ester of polyol is processed using this method and formed into a fibrous rod, the various disadvantages previously described with respect to U.S. Pat. No. 4,030,440 are present and furthermore carboxylic acid ester of polyol is mixed into the collected second material. If the second material is reused, various problems arise.

SUMMARY OF THE INVENTION

An object of the present invention is thus to provide a method whereby acetate fiber impregnated with carboxylic acid ester of polyol which is a plasticizer for the acetate fiber is formed in a predetermined shape using microwave energy. Water is used during microwave energy application which was heretobefore considered impossible. Fiber rods produced according to the present invention are well suitable for cigarette filters.

According to the present invention, although the acetate fiber is impregnated with carboxylic acid ester, the configuration stabilization of the acetate fiber is extremely high. The invention is readily applicable to the manufacture of a wrapperless fibrous filter rod.

According to the present invention, water is used as a microwave absorbing material and the water is heated to approximately 100° C. which is sufficient to reduce the energy needed for producing fibrous rods.

The boiling point of water is relatively low, 100° C., while the boiling point of carboxylic acid ester of polyol is relatively high, 250° to 260° C. Since fibrous rod production is carried out at a temperature at which the water is heated due to the microwave absorption, that is, at approximately 100° C. according to the present invention.

In accordance with the present invention, carboxylic acid ester of polyol impregnated in the acetate fiber is activated by microwave energy absorbed in water. Therefore, carboxylic acid ester of polyol is very rapidly dispersed causing it to permeate into the acetate fiber to thereby rapidly complete the stabilization or solidification of the acetate fibrous rod.

According to the present invention, the temperature to which the acetate fiber is heated is low, approximately 100° C., and the cooling thereof is readily carried out. Thus deformation of the rods due to heat is not a problem and rods having a uniform configuration are rapidly produced.

DESCRIPTION OF THE PREFERRED EMBODIMENTS

The present invention will now be described with reference to the accompanying drawings.

Figure 1:
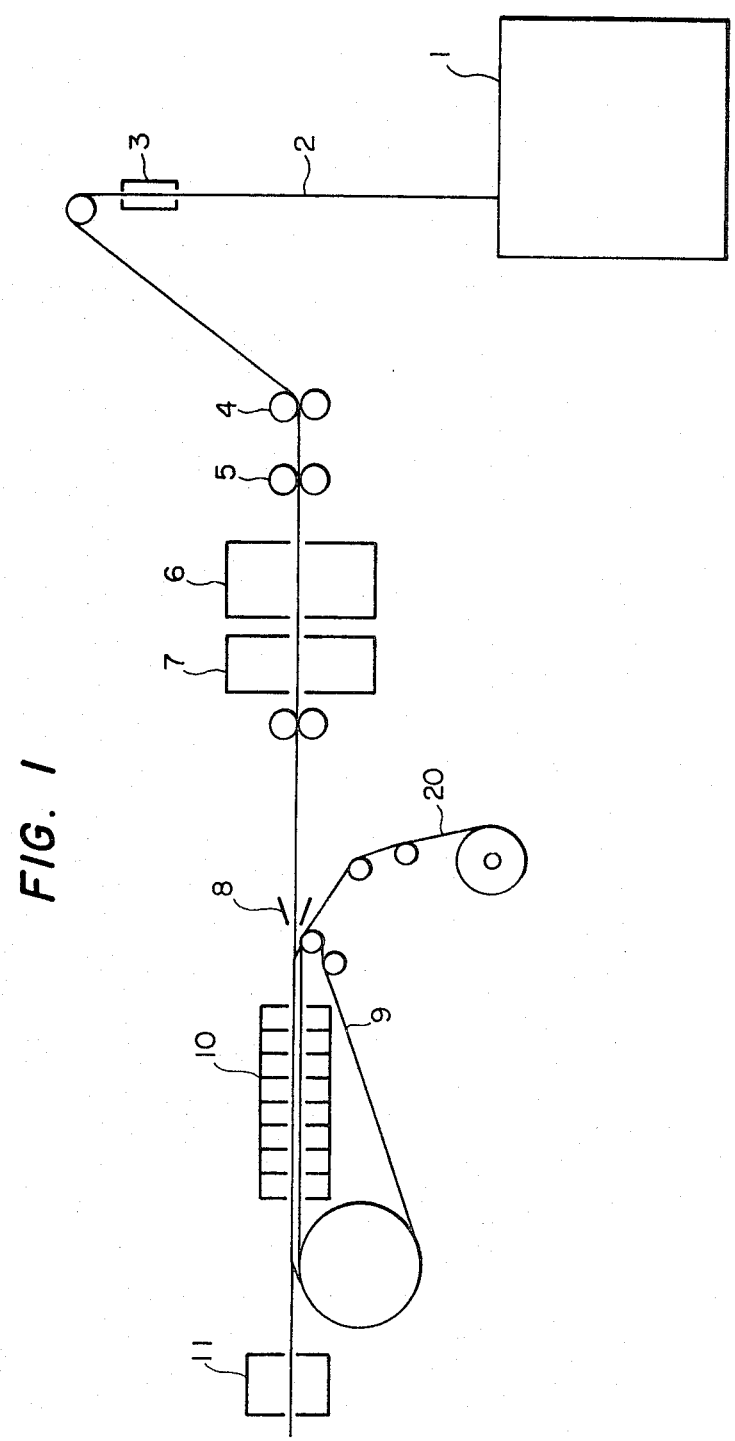
FIG. 1 is a schematic view showing an apparatus according to the present invention.

An apparatus according to the present invention will be described referring to FIG. 1. Reference numeral 1 designates a bale for cellulose ester fibers and numeral 2 designates a tow drawn from the bale 1. Reference numeral 3 denotes a preliminary tow opening device for producing a filter rod having a uniform filtration efficiency from the tow 2. Reference numerals 4 and 5 denote nip roller type opening devices. Reference numeral 6 denotes a device for impregnating carboxylic acid ester of polyol into the opened tow 2. Reference numeral 7 denotes a device for feeding water to the opened tow 2. The tow 2 impregnated with carboxylic acid ester of polyol is converged by a guide 8 (which may be dispensed with if desired). The periphery of the tow 2 is then wrapped with a continuous endless belt 9 made of material through which microwave energy can easily penerate and the tow is passed through a microwave applicator 10. It is necessary that water be provided to the filter rod during the microwave process. The filter rod is rapidly cured by the water contained in the filter rod and by carboxylic acid ester of polyol to thereby provide a filter rod having a stabilized shape. The final filter rod is cut by cutter to a predetermined length.

Figure 2:
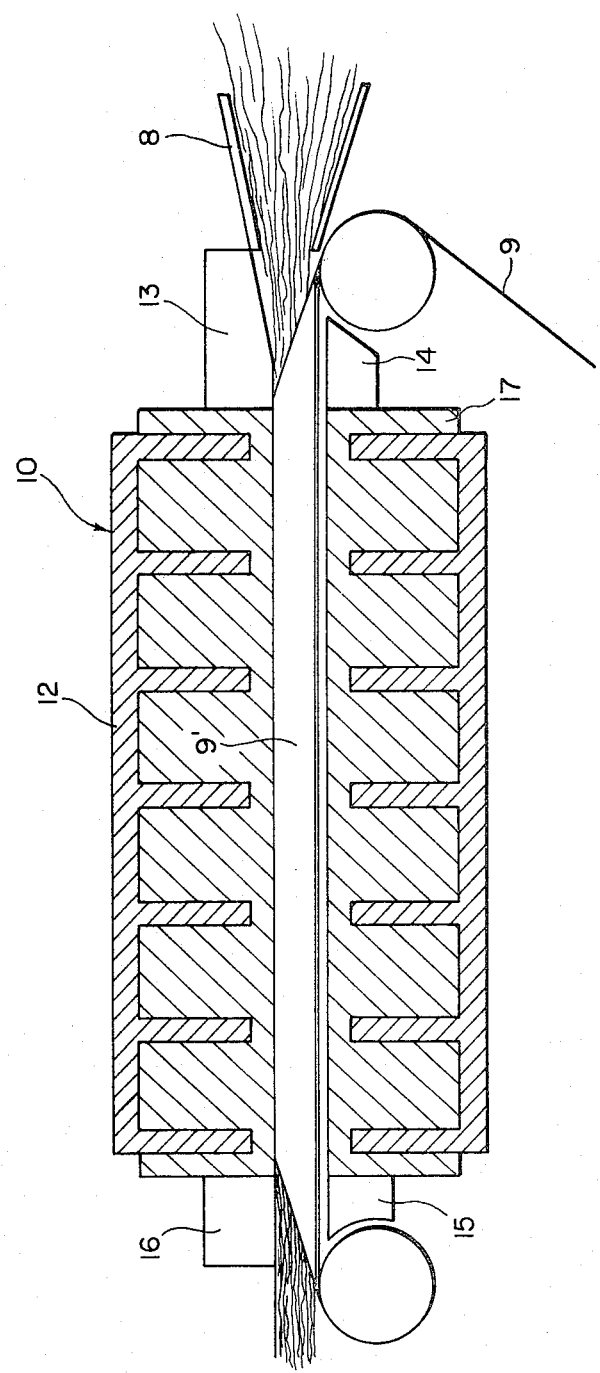
FIG. 2 is an enlarged view of the microwave energy applicator used in the apparatus shown in FIG. 1.

FIG. 2 shows an enlarged cross-sectional view of the microwave applicator section in which reference numeral 17 denotes a tubular forming guide through which the microwave penerates and numerals 13 to 16 denote guides for forming the fibrous tow into a fibrous rod. The fibrous rod 9' encased in the endless belt 9 is delivered by these guides.

It is necessary that the fibrous rod passing through a microwave applicator portion 12 of the applicator 10 contain water uniformly. The water is impregnated into the fibrous tow before the fibrous tow is formed into the fibrous rod. Otherwise, it is possible to provide at an inlet or an intermediate position of the applicator a device for feeding vaporized moisture to the fibrous rods. In this case, steam may be used as the vaporized moisture. It is preferable that the belt through which the microwave energy is transmitted be made of material through which vaporized moisture is also readily transmitted. For example, the belt can be made of a fabric material.

For use with the present invention, the cellulose containing fibrous material can be regenerated acetylated cellulose or the like. Particularly, cellulose diacetate is preferable. Any fiber shape, either a long or a short fiber, may be used.

Carboxylic acid ester of polyol material used with the invention is preferably a material selected from the group of diacetate, dipropinate, dibutylate and triacetate of a polyol selected from grycerols or polyethylene glycols wherein the unit of ethylene glycol, diethylene glycol, triethylene glycol, tetraethylene glycol or polyethylene glycol which has an ethylene glycol polymerizing unit of 200 to 600. In these compounds, triethylene glycol diacetate and glycerol triacetate are preferable. The weight percentage of carboxylic acid ester of polyol is preferably 2 to 15%, more preferably 4 to 8%, with respect to the cellulose ester fiber. In case the weight percentage of the carboxylic acid ester of polyol is not greater than 2%, the molding characteristics during the manufacture of the fibrous rod from the cellulose ester fibrous material are reduced. If the weight percentage thereof is greater than 15%, a fibrous tow is soft and poor in form stability. Such a fibrous rod is not desired due to the poor smoke taste thereof.

The water used in the invention may be in either a liquid or vapor state. The moisture is that absorbed into the cellulose containing fiber which adheres thereto and is held between neighboring fibers. It is preferable to use water in amounts of 1 to 100%, preferably 4 to 40% of the fiber weight. If the amount of water used is not greater than 1% by weight, the microwave efficiency is significantly reduced and the rod forming characteristics deteriorate. If water is used excessively, a large amount of energy is needed to remove the moisture from the finished fibrous rods. For providing the cellulose ester fiber with water, many known methods can be used to adjust the moisture content of the cellulose ester fiber in advance. Moisture can be sprayed, a water containing roller or rolling brush can be used, or a steam feeding passage can be provided at a midportion of the fiber rod forming apparatus.

In the present invention, a suitable belt is, for example, a tape shaped member through which microwave energy can readily pass. Materials which are suitable for polyolefins such as polyethylene or polypropylene, polyfluoroethylene, polyester, cotton and linen. A belt made of sheet material from which water is readily removed is preferable. For this reason, it is preferable that the belt be made up of a water permeable tape with suitable micro- or macro-perforations.

For use with the present invention, the microwave frequency can be made from 300 to 30,000 MHz or, preferably 915±25 MHz, 2,450±50 MHz, 5,800±75 MHz or 22,125±125 MHz.

Since the fibrous rods produced using the present invention solidify in configuration in a very short period of time, the production efficiency therefor is remarkably superior to that of the prior art. Heat applied to the fibrous rod is generated utilizing microwave absorption in water which is achieved at a temperature of approximately 100° C. Therefore, the energy needed to form the fiber rod is small and the cooling energy needed is also small.

The configuration stabilization of the fibrous rod produced according to the present invention is high so that the amount of fiber used in the fibrous rod can be increased to thereby increase the filtration efficiency. It is preferable to use a 15,000 to 70,000 D tow for the cellulose ester fiber.

The cross section of the fibrous rod produced according to the present invention may be rectangular or star-shaped as well as circular and oblong shapes. A fibrous tow processed according to the invention may also be used as a liquid retainer or a blood separation device.

EXAMPLE 1

A crimped cellulose diacetate tow of 4 dpf and 50,000 D in total was drawn from a bale and processed using a water spray. After glycerol triacetate was applied to the opened tow so that its weight percentage was 6% of the fiber weight, water was sprayed thereon so that the water percentage was 11 percent by weight. After the tow to which water and the glycerol triacetate were applied was converged by a guide, the periphery thereof was surrounded by a continuous endless belt made of woven polytetrafluoroethylene fiber. The tow in this condition was passed through a microwave applicator. The frequency of the microwaves was 2,450±50 MHz. The time period for passage through the microwave applicator was approximately 1 sec.

Figure 4:
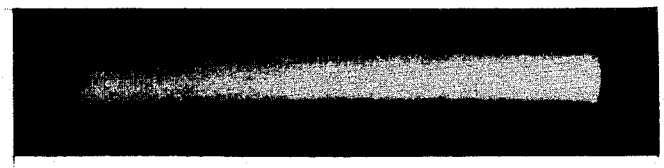
FIG. 4 is a photograph of a filter rod without a wrapping paper produced using the present invention.

A plan view photograph of fibrous rod thus obtained is shown in FIG. 4. The configuration stabilization of the rod was quite acceptable. No deformities were observed. The water percentage thereof was about 6% by weight. Glycerol triacetate was fully dispersed in the fiber and the rod had a suitable hardness.

Figure 3:
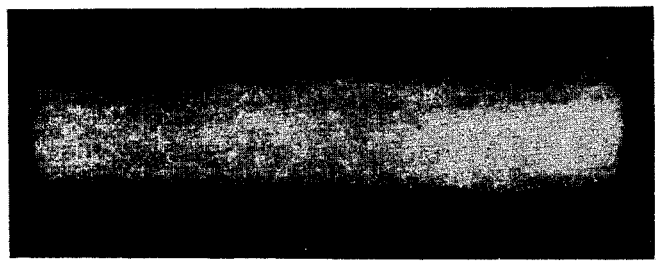
FIG. 3 is a photograph of a filter rod from which a wrapping paper produced using a prior art technique is removed.

A second fibrous rod was produced as specified in U.S. Pat. No. 3,413,689. The second fibrous rod from which the wrapping paper was removed is shown in FIG. 3 from which it may be seen that the configuration stability was poor and the rod was expanded radially. Also, the rod was not fully hard and was not suitable for a cigarette filter.

EXAMPLE 2

After crimped cellulose diacetate tows of 4 dpf and 50,000 D were opened, triethylene glycol diacetate or glycerol triacetate was sprayed thereon with ratios as specified in Table 1. After these tows were converged by guide 8 shown in FIG. 1, the tows were surrounded by a continuous endless belt woven of polyester fiber and were fed into the microwave applicator. Vaporized water was supplied from the inlet portion of the microwave applicator 10 with the values specified in Table 1 and the tows were processed with microwaves of frequency 2,450±50 MHz to thereby form wrapperless fibrous rods. The speed of the tows through the microwave applicator was specified in Table 1. The thus obtained fiber's rod had a good configuration stability.

TABLE 1

| | 1 | 2 | 3 | 4 |
|---|---|---|---|---|
| Triethylene glycol diacetate | 8 | — | — | 4.4 |
| Glycerol triacetate | — | 7.8 | 10.3 | 6.2 |
| Water percentage contained in fiber rod (wt %) | 11 | 10 | 10.1 | 13.0 |
| rod dimension Maximum diameter | 7.8 | 7.8 | 7.8 | 7.8 |
| rod dimension Minimum diameter | 7.7 | 7.8 | 7.7 | 7.7 |
| Production speed of fibrous rod (m/min) | 10 | 10 | 10 | 40 |

What is claimed is:

1. A method for producing fibrous rod articles having a desired configuration stabilization comprising the steps of:
   forming into fibrous rods cellulose esters fibers impregnated with at least one carboxylic acid ester of polyol;
   uniformly impregnating said cellulose ester fibers with water; and
   irradiating the fibrous rods with microwave energy to heat said water to a predetermined temperature.

2. The method as defined in claim 1 wherein the amount of the carboxylic acid ester of polyol contained in the cellulose ester fibers is 4 to 8% by weight.

3. The method as defined in claim 1 wherein the carboxylic acid ester of polyol is selected from the group consisting of triethylene glycol diacetate and glycerol triacetate.

4. The method as defined in claim 1 wherein the amount of water contained in the fibrous rods is 1 to 100% of the fiber weight.

5. The method as defined in claim 4 wherein the amount of water contained in the fibrous rods is 4 to 40% of the fiber weight.

6. The method as defined in claim 4 wherein the amount of water contained in the cellulose ester fibers before formation of said fibrous rods is 1 to 100% by weight.

7. The method as defined in claim 4 wherein said step of impregnating said fibrous rods with water comprises supplying water in vapor form to said fibrous rods.

8. The method as defined in any of claims 1, 4, 5, 6 or 7 wherein said cellulose ester fiber comprises cellulose diacetate.

* * * * *